(No Model.)
A. K. MANSFIELD.
THROTTLE VALVE.
No. 604,771. Patented May 31, 1898.
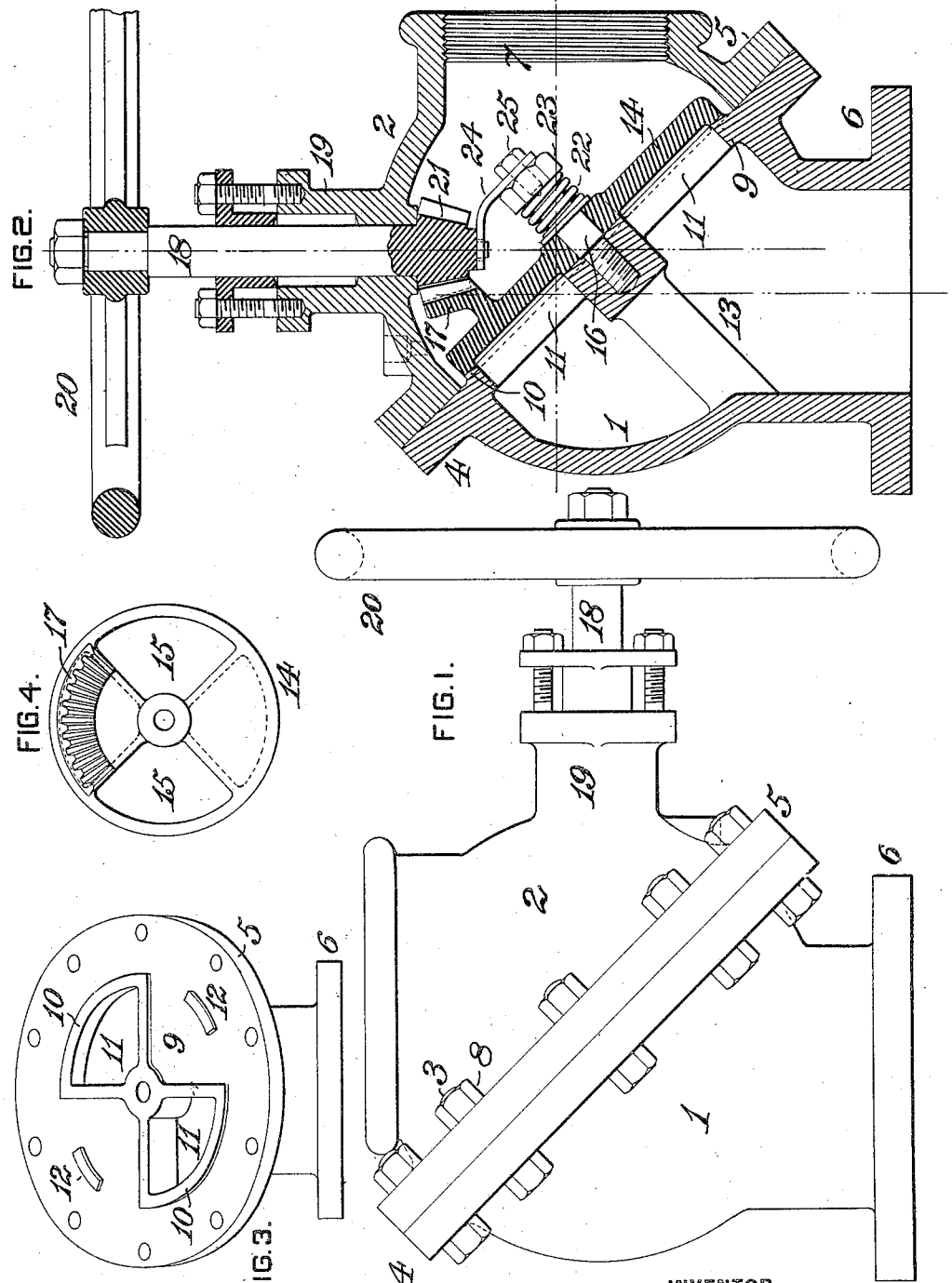
WITNESSES:
Chas. F. Miller.
S. R. Bell.
INVENTOR,
Albert K. Mansfield
by J. Howden Bell,
Att'y.

UNITED STATES PATENT OFFICE.

ALBERT K. MANSFIELD, OF SALEM, OHIO.

THROTTLE-VALVE.

SPECIFICATION forming part of Letters Patent No. 604,771, dated May 31, 1898.

Application filed January 8, 1897. Serial No. 618,450. (No model.)

*To all whom it may concern:*

Be it known that I, ALBERT K. MANSFIELD, of Salem, in the county of Columbiana and State of Ohio, have invented a certain new and useful Improvement in Throttle-Valves, of which improvement the following is a specification.

The object of my invention is to provide a throttle or stop valve for controlling the flow of steam or other fluid which shall be of simple and inexpensive construction and adapted by a readily-effected adjustment to serve either as an "angle-valve" or a "straightway" valve, as may be desired.

The improvement claimed is hereinafter fully set forth.

In the accompanying drawings, Figure 1 is a view in elevation of a throttle-valve embodying my invention, the same being adjusted in position to serve as a straightway valve; Fig. 2, a vertical central section when adjusted to serve as an angle-valve; Fig. 3, a view in elevation and on a reduced scale of the lower section of the valve-body detached; and Fig. 4, a plan view, on a similar scale, of the valve member proper.

In the practice of my invention I provide a valve-body composed of two sections 1 2, which are preferably substantially hemispherical and abut by finished faces, which are inclined at an angle of preferably forty-five degrees to the axes of the sections and are connected by bolts 3, passing through flanges 4 5, which project from the walls of the sections and form parts of the abutting surfaces thereof. The sections are provided with tubular pipe connections, as a flanged passage 6 and a threaded passage 7, respectively, at their ends farthest from their abutting faces and are clamped firmly together by nuts 8, engaging the threads of the bolts 3. The axes of the pipe connections are offset from the common center of the two sections of the valve-body, as indicated in Fig. 2, and economy of space is thereby attained, as a smaller body for a given diameter of pipe may by this means be employed. A transverse partition 9, on which is formed a valve-face 10, is fixed to one of the sections of the body, as the section 1, at the end opposite the pipe connection, said partition being inclined correspondingly with the abutting face of the section and being in this case cast integral therewith. The valve-face projects slightly above the face of the partition and is in the form of two opposite sectors, each of which incloses a port 11 for the passage of fluid. In order to provide additional bearing-surface for the valve, the valve-face may be extended either entirely or partially from one sector to the other, and in the instance shown two opposite arc-formed faces 12, which are flush with the segmental portions of the valve-face, are interposed between their outer ends, the faces 12 preventing the valve member from dropping or canting between the segmental portions. A central support 13 for the partition 9, extending therefrom to the wall of the body-section, may be provided for the purpose of strengthening the partition.

The valve member proper 14 consists of a plate or disk having a finished rim corresponding substantially in diameter and width with the curved portions of the valve-face and provided with two opposite sector-shaped ports 15, corresponding to the ports of the partition 9. The valve member 14 is journaled to move freely about its axis on a stem 16, which is fixed centrally on the partition 9 and is provided with a segmental gear 17 near its periphery, through which movement is imparted to it from an operating-stem 18. The stem 18 is fitted to rotate in the other section 2 of the valve-body, with its axis at substantially a right angle to that of the pipe connection of said section and preferably passes through a properly-packed stuffing-box 19. A hand-wheel 20 is secured upon the outer end of the stem 18, and a bevel-pinion 21 is formed upon or fixed to its inner end, said pinion meshing with the segmental gear 17 of the valve member 14 and imparting movement thereto about its axis in one or the other direction to wholly or partially cover or uncover the ports 11 of the partition 9 by and in accordance with the rotation in one or the other direction of the operating-stem 18.

The pinion 21 is faced off truly on its upper side and abuts against a correspondingly-finished face on the valve-body, to which it is held with sufficient pressure to maintain a tight joint by a light plate-spring 24. By this construction a stuffing-box for the valve-stem 18 may be dispensed with, or if it be employed it may be packed while the valve is under steam. The spring 24 is in the instance shown connected by a stud 25 to the stem 16 of the valve member; but such specific location of its fixed end is merely a matter of convenience, and it may, if preferred, be connected directly to the valve-body.

The valve member 14 is held with the proper degree of tightness against the valve-face by an elastic resistance interposed between it and the operating-stem 18, consisting in the instance shown of a helical spring 22, which surrounds the stem 16 of the valve member and is varied in tension and held in position by a nut 23, engaging the outer end of said stem.

It will be seen that the valve may be readily converted from an angle-valve to a straightway valve, and vice versa, by merely removing the bolts 3 and turning the section 2 of the body upon its axis until the pipe connection 7 thereof assumes the vertical or the horizontal position desired, after which the body-sections are bolted together, and the appliance is ready for use, the change of position of the section which carries the stem involving no change in the operative relation of the gearing and appliances by which the valve member is moved and held in proper relation to the valve-face. A full and direct passage for fluid through ports of large area is provided, and the quick opening and closure of said ports is effected by the multiplying-gearing through which the valve member proper is actuated.

I claim as my invention and desire to secure by Letters Patent—

1. The combination, substantially as set forth, of a valve-body composed of two sections, provided, each, with a pipe connection, and abutting in a plane inclined to the axis of the valve-body, said sections being relatively adjustable to form either a straightway or an angle valve, a valve-face fixed to one of said sections, a valve fitted to move about an axis thereon, an operating-stem which is fitted to be rotated in the other section, at an angle with the abutting face thereof, and gearing through which movement is imparted to the valve from the stem, the stem being, in each adjustment of the valve-body sections, at right angles to the axis of one section, and at right angles to the axes of both sections when they are adjusted to form a straightway valve.

2. The combination, substantially as set forth, of a valve-body composed of two substantially hemispherical sections, each provided with a pipe connection the axis of which is offset from the center of the valve-body, and abutting in a plane inclined to the axis of the valve-body, peripheral flanges surrounding the abutting faces of said sections, connecting-bolts passing through said flanges, a valve-face fixed to one of said sections, a valve fitted to move about an axis thereon, a stem which is rotatable in the other section, and gearing through which movement is imparted to the valve from the stem.

3. The combination, substantially as set forth, of a valve-body composed of two sections, each provided with a pipe connection, and abutting in a plane inclined to the axis of the valve-body, a valve-face fixed to one of said sections, a valve fitted to move about an axis thereon, a stem which is rotatable in the other section, gearing through which movement is imparted to the valve from the stem, and a spring interposed between, and acting on, the valve and an abutment independent thereof.

4. The combination, substantially as set forth, of a valve-body composed of two sections, each provided with a pipe connection, and abutting in a plane inclined to the axis of the valve-body, a valve-face fixed to one of said sections, a valve fitted to move about an axis thereon, a gear fixed to said valve, a stem which is rotatable in the other section, a pinion fixed to said stem and forming a joint with a face on the valve-body at the inner end of the stem, and a spring bearing on said pinion and on a fixed abutment.

5. The combination, substantially as set forth, of a valve-body composed of two sections, each provided with a pipe connection and abutting in a plane inclined to the axis of the valve, a transverse ported partition on one of the sections at the end opposite the pipe connection thereof, a central support extending from the partition to the wall of the section, a valve-face on said partition, a valve fitted to move about an axis thereon, a stem which is rotatable on the other section, and gearing through which movement is imparted to the valve from the stem.

ALBERT K. MANSFIELD.

Witnesses:
J. SNOWDEN BELL,
F. E. GAITHER.